(12) United States Patent
Wang et al.

(10) Patent No.: US 9,963,052 B2
(45) Date of Patent: May 8, 2018

(54) SEAT SYSTEM

(71) Applicant: Lear Corporation, Southfield, MI (US)

(72) Inventors: Hui Wang, Shanghai (CN); Shufeng Zhang, Shanghai (CN); Weiwei Zhu, Shanghai (CN); XiaoZhong Wu, Shanghai (CN); Chenwei Gu, Shanghai (CN)

(73) Assignee: Lear Corporation, Southfield, MI (US)

( * ) Notice: Subject to any disclaimer, the term of this patent is extended or adjusted under 35 U.S.C. 154(b) by 189 days.

(21) Appl. No.: 15/172,189

(22) Filed: Jun. 3, 2016

(65) Prior Publication Data

US 2017/0349067 A1    Dec. 7, 2017

(51) Int. Cl.
*B60N 2/42*    (2006.01)

(52) U.S. Cl.
CPC .................... *B60N 2/4249* (2013.01)

(58) Field of Classification Search
USPC ............. 297/452.55; 296/68.1, 67, 65.01, 64
See application file for complete search history.

(56) References Cited

U.S. PATENT DOCUMENTS

| | | | | |
|---|---|---|---|---|
| 3,758,159 A * | 9/1973 | Morris | ...................... | B60N 2/38 297/452.14 |
| 3,841,704 A * | 10/1974 | Platner | ...................... | A47C 3/12 297/440.2 |
| 4,512,604 A * | 4/1985 | Maeda | ...................... | B60N 2/02 280/748 |
| 5,362,132 A | 11/1994 | Griswold et al. | | |
| 5,516,179 A * | 5/1996 | Tidwell | .................. | B60N 2/015 296/63 |
| 6,186,574 B1 * | 2/2001 | Motozawa | ........... | B60N 2/4221 296/68.1 |
| 7,104,592 B2 * | 9/2006 | Song | ..................... | B60N 2/4235 296/187.12 |
| 7,413,242 B2 | 8/2008 | Rashidy et al. | | |
| 7,959,232 B2 | 6/2011 | Sawada et al. | | |
| 8,033,602 B2 * | 10/2011 | Yamaki | ............... | B60N 2/4249 297/216.13 |
| 9,327,767 B2 * | 5/2016 | Ikeda | .................. | B62D 21/157 |
| 9,452,693 B2 * | 9/2016 | Gardner | .................. | B60N 2/24 |
| 2004/0108752 A1 * | 6/2004 | Rajasingham | ........... | A61G 5/04 296/68.1 |
| 2005/0161967 A1 * | 7/2005 | Rashidy | ..................... | B60J 7/04 296/65.01 |

FOREIGN PATENT DOCUMENTS

WO        2014115787 A1      7/2014

\* cited by examiner

*Primary Examiner* — David E Allred
(74) *Attorney, Agent, or Firm* — Brooks Kushman P.C.

(57) ABSTRACT

A seat system having a seat bottom and a cross beam. The seat bottom may include a support block, a cushion, and a trim cover. The cushion may be disposed on the support block. The trim cover may be disposed on the cushion. The cross beam that is disposed on the support block such that the cross beam does not extend through the seat bottom.

20 Claims, 5 Drawing Sheets

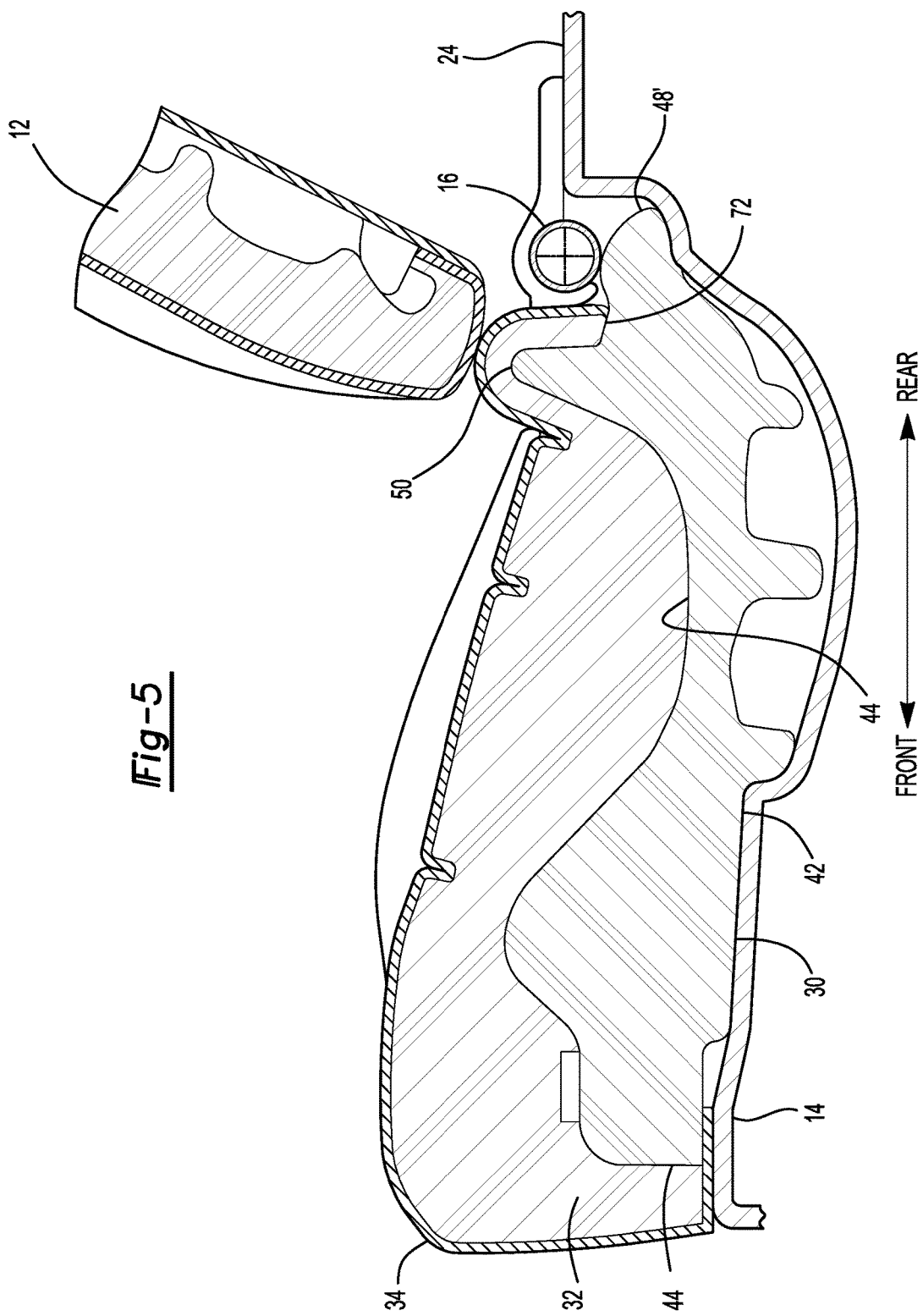

SEAT SYSTEM

TECHNICAL FIELD

This disclosure relates to a seat system that includes a seat bottom and a cross beam.

BACKGROUND

A structural seat system for an automotive vehicle that has a seat bottom that is entirely located forward of a structural reinforcement beam is disclosed in U.S. Pat. No. 7,413,242.

SUMMARY

In at least one embodiment, a seat system is provided. The seat system may include a seat bottom and a cross beam. The seat bottom may have a support block, a cushion, and a trim cover. The cushion may be disposed on the support block. The trim cover may be disposed on the cushion. The cross beam may extend laterally across the seat bottom and may be disposed on a top side of the support block such that the cross beam does not extend through the seat bottom.

In at least one embodiment, a seat system is provided. The seat system may include a seat bottom and a cross beam. The seat bottom may include a support block, a cushion, and a trim cover. The support block may have a front side, a first rear flange, and a second rear flange. The first rear flange and the second rear flange may be spaced apart from each other and may extend away from the front side of the support block. The first and second rear flanges may each have a first protrusion that may extend toward a seat back. The cushion may be disposed on the support block and may extend across the front side. The cushion may not be disposed on the first and second rear flanges. The trim cover may be disposed on the cushion. The cross beam may extend laterally across the seat bottom such that the cross beam does not extend through the seat bottom. The cross beam may be disposed on the first protrusions of the first and second rear flanges and may not engage the cushion and the trim cover.

BRIEF DESCRIPTION OF THE DRAWINGS

FIG. 5 is a section view of the seat system along section line 5-5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
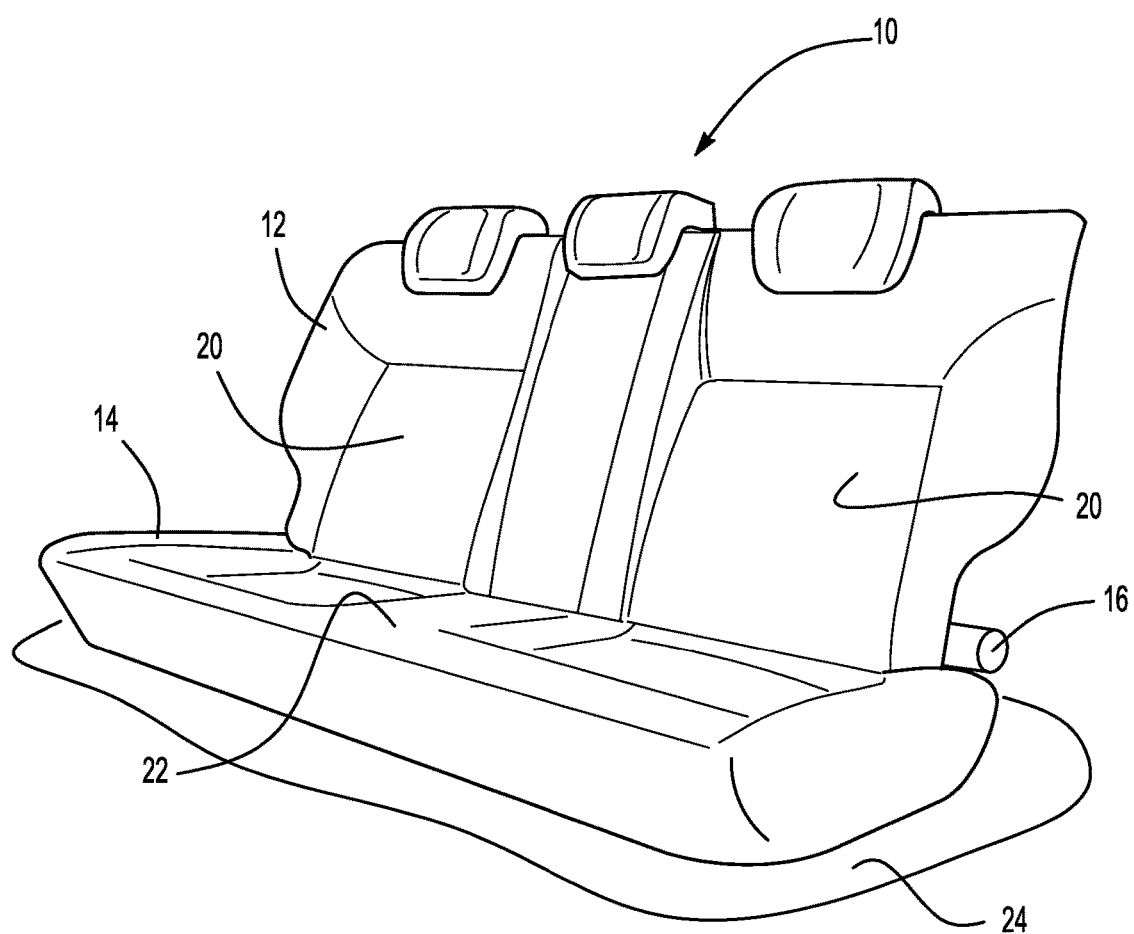
FIG. 1 is a front perspective view of a seat system.

Referring to FIG. 1, an exemplary seat system 10 is shown. The seat system 10 may be provided with or configured for use with a vehicle, such as a motor vehicle like a car or truck.

The seat system 10 may be configured as a rear seat that may be positioned behind a front seating row or front seat that may receive a vehicle driver. The seat system 10 may include a seat back 12, a seat bottom 14, and a cross beam 16.

The seat back 12 and the seat bottom 14 may cooperate to provide one or more seating positions. For instance, the seat back 12 and seat bottom 14 may cooperate to define one or more primary seating positions 20 and a secondary seating position 22. The secondary seating position 22 may be disposed between two primary seating positions 20 and may be located near or at the center of the seat system 10. A foldable armrest may be provided in the seat back 12 at the secondary seating position 22.

The seat back 12 may be configured to support the back of a seat occupant. The seat back 12 may be disposed proximate the seat bottom 14. For example, the seat back 12 may be disposed above the seat bottom 14 and may be separate from the seat bottom 14. Thus, the seat back 12 may not be attached to the seat bottom 14.

Figure 4:
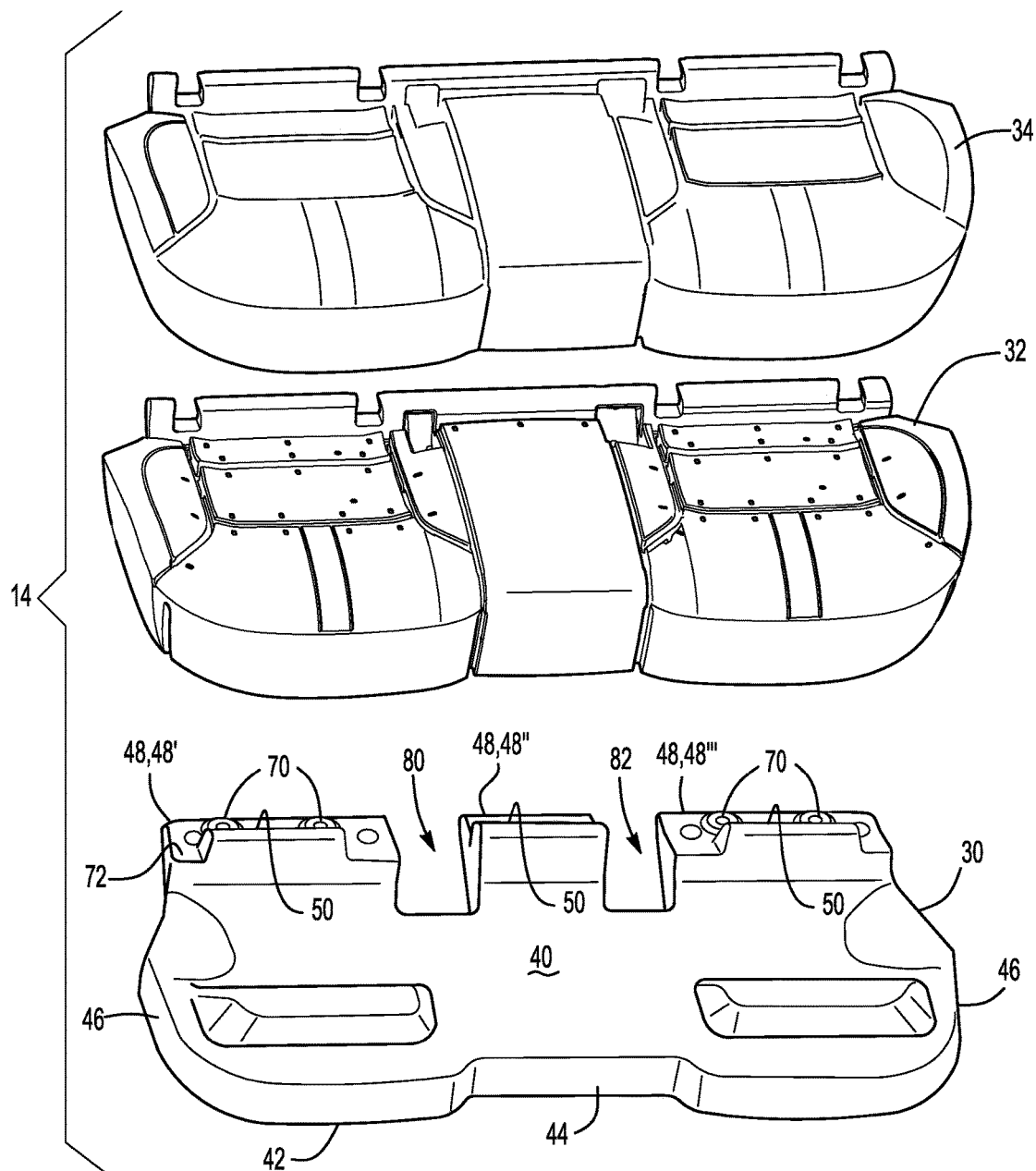
FIG. 4 is an exploded view of the seat bottom.

The seat bottom 14 may be disposed adjacent to the seat back 12. Like the seat back 12, the seat bottom 14 may also be configured to support a seat occupant. The seat bottom 14 may be configured to be mounted on a support surface, such as a vehicle body structure 24 like a floor pan of a vehicle. As is best shown in FIGS. 4 and 5, the seat bottom 14 may include a support block 30, a cushion 32, and a trim cover 34.

The support block 30 may be disposed on the vehicle body structure 24. The support block 30 may support the cushion 32 and may be inhibited from moving away from the vehicle body structure 24 by the cross beam 16 as will be discussed in more detail below. The support block 30 may be made of any suitable material. For example, the support block 30 may be made of a structural polymeric material, such as expanded polypropylene (EPP), which may be a lightweight structural foam. In at least one embodiment, the support block 30 may have a top side 40, a bottom side 42, a front side 44, a pair of lateral sides 46, at least one rear flange 48, at least one top flange 50, and one or more mounting hooks 52.

The top side 40 may be disposed proximate the cushion 32 and may engage the cushion 32. The top side 40 may face away from the vehicle body structure 24.

Figure 2:
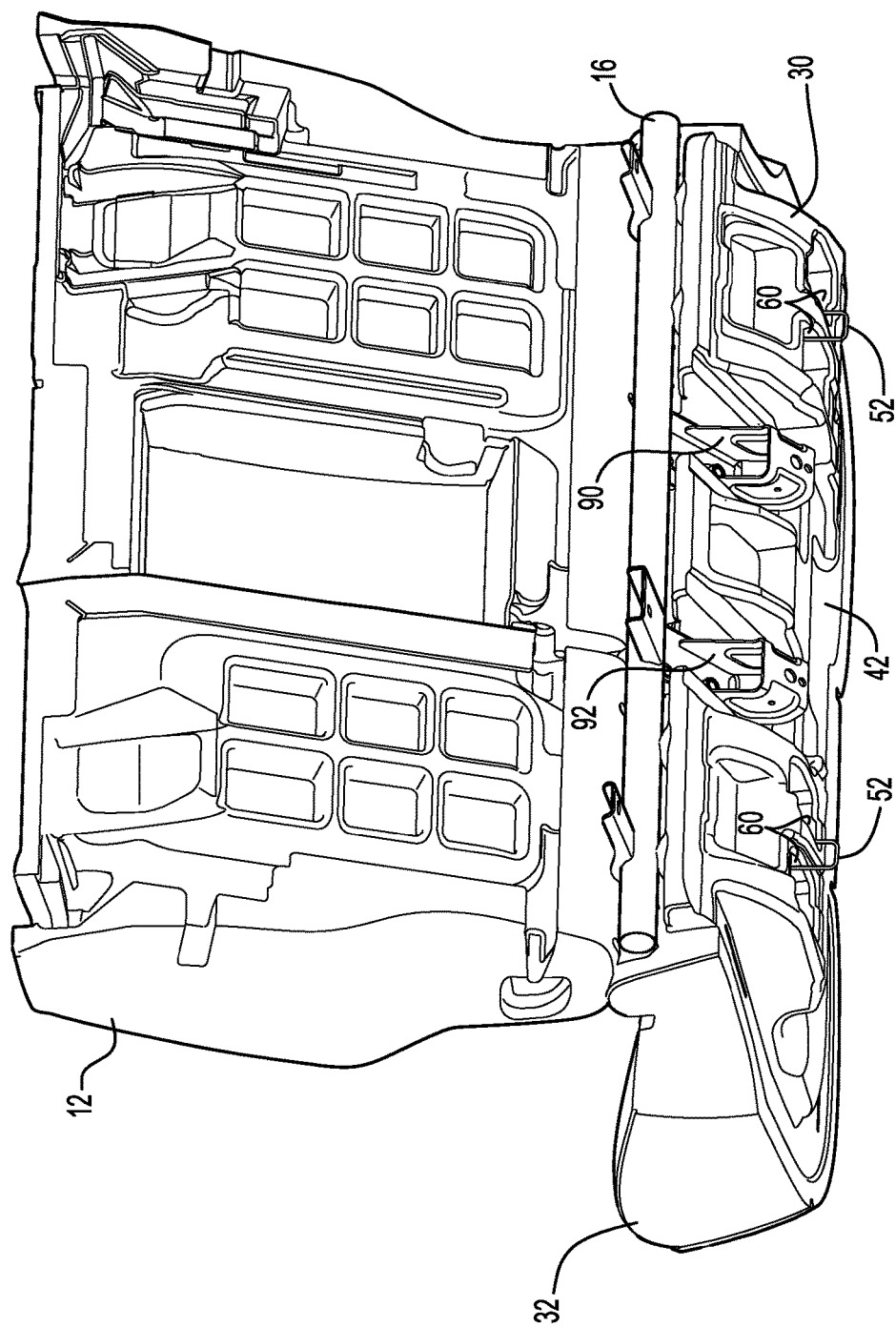
FIG. 2 is a rear perspective view of the seat system without a trim cover.

The bottom side 42 may be disposed opposite the top side 40. The bottom side 42 may be disposed proximate and may engage the vehicle body structure 24. As is best shown in FIG. 2, the bottom side 42 may include one or more pockets 60. The pockets 60 may extend from the bottom side 42 toward the top side 40.

The front side 44 may be disposed along the front of the support block 30 or side of the support block 30 disposed opposite the cross beam 16. The front side 44 may extend from the top side 40 to the bottom side 42. As is best shown in FIG. 5, the front side 44 may be concealed by or covered by the cushion 32.

The lateral sides 46 may be disposed on opposite sides of the support block 30. The lateral sides 46 may extend from the top side 40 to the bottom side 42. In addition, the lateral sides 46 may extend from the front side 44 toward the back or rear side of the support block 30.

Figure 3:
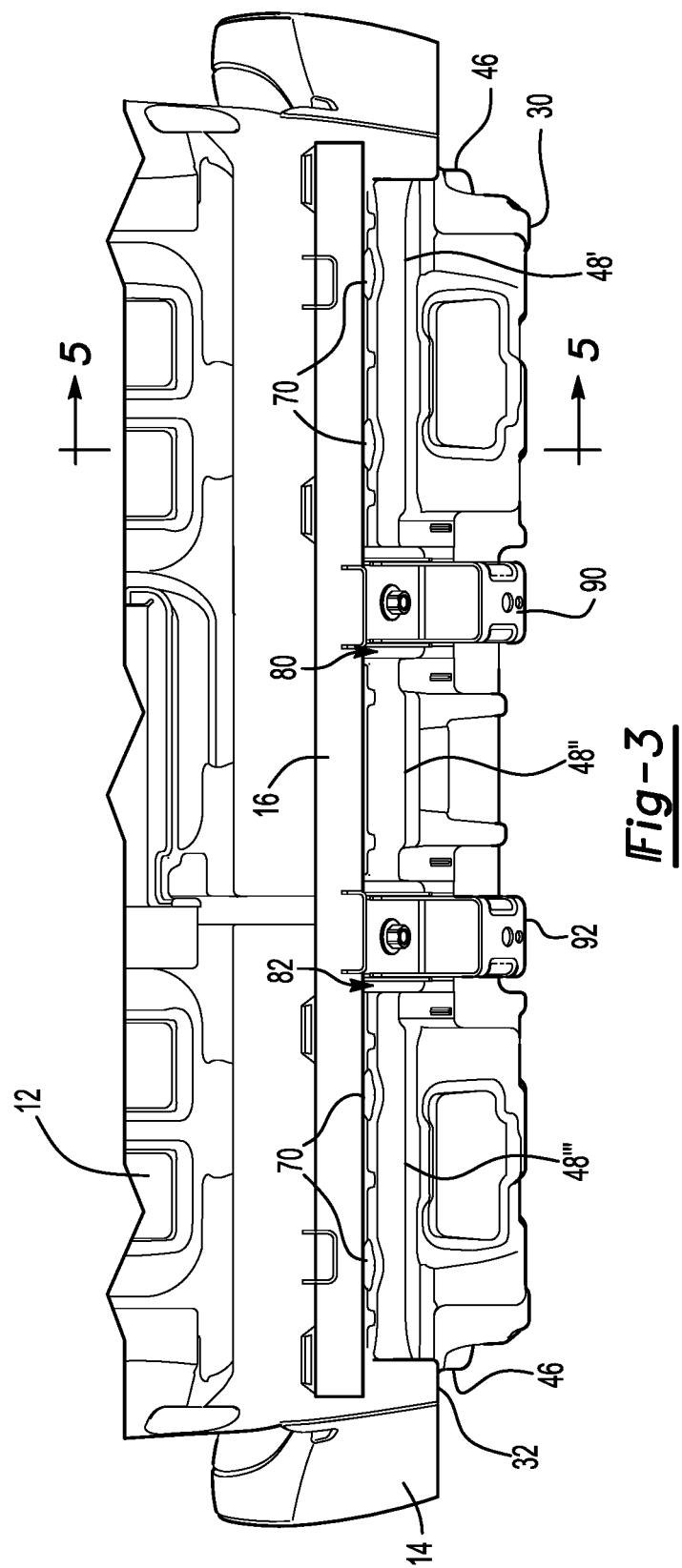
FIG. 3 is a rear view of the seat system showing a seat bottom and a cross beam.

One or more rear flanges 48 may extend from the support block 30. As is best shown in FIGS. 3 and 4, the support block 30 may have a first rear flange, a second rear flange, and a third rear flange. For convenience in reference below, the first rear flange is designated with reference number 48', the second rear flange is designated with reference number 48", and the third rear flange is designated with reference number 48''', and reference number 48 is used to generically reference any rear flange.

Referring to FIGS. 4 and 5, the rear flanges 48 may be disposed proximate or adjacent to the top side 40 and may extend rearward or away from the front side 44 of the support block 30. As such, the rear flanges 48 may extend from the back of the support block 30. In addition, the rear flanges 48 may at least partially exposed and not covered by the cushion 32 or the trim cover 34. As is best shown in FIG. 5, the rear flanges 48 may be disposed under the seat back 12 and under the cross beam 16, but may not be attached to or coupled to the cross beam 16. One or more of the rear flanges 48 may be tucked under and may engage the cross beam 16 to inhibit upward movement of the seat bottom 14 as will be discussed in more detail below.

The first rear flange 48' and the second rear flange 48" may extend rearward from the primary seating positions 20. The first rear flange 48' may be completely spaced apart from the second rear flange 48". In addition, seat back 12 may be disposed above and may not engage the first rear flange 48' and the second rear flange 48".

The first rear flange 48' and the second rear flange 48" may include one or more protrusions 70. The protrusions 70 may be disposed on a top surface of the first and second rear flanges 48. The protrusions 70 may face away from the bottom side 42 and may extend toward the seat back 12. Moreover, the protrusions 70 may extend toward and may engage the cross beam 16. In FIGS. 3 and 4, the first rear flange 48' and the second rear flange 48" each have two protrusions 70. The protrusions 70 may be spaced apart from each other and may be spaced apart from opposing lateral sides of an associated rear flange 48', 48".

The third rear flange 48''' may extend rearward from the secondary seating position 22. As is best shown in FIG. 4, the third rear flange 48''' may be disposed between the first rear flange 48' and the second rear flange 48". Moreover, the third rear flange 48''' may be completely spaced apart from the first rear flange 48' and the second rear flange 48". For example, a first gap 80 and a second gap 82 may be disposed on opposite lateral sides of the third rear flange 48'''. The first gap 80 may extend from the back or rear of the support block 30 toward the front side 44 of the support block 30 and may separate the first rear flange 48' from the third rear flange 48'''. Similarly, the second gap 82 may extend from the back or rear of the support block 30 toward the front side 44 and may separate the second rear flange 48" from the third rear flange 48'''. The third rear flange 48''' may not have a protrusion 70 and may not engage the cross beam 16 in its normal installation position. In addition, seat back 12 may be disposed above and may not engage the third rear flange 48'''.

Referring to FIGS. 4 and 5, a groove 72 may be provided with the first rear flange 48', the second rear flange 48", and the third rear flange 48'''. The groove 72 may extend toward the bottom side 42 of the support block 30 and may extend laterally across the rear flange (e.g., in a lateral direction or between opposite lateral sides of a rear flange). In addition, the groove 72 may be disposed adjacent to a corresponding top flange 50 and may be generally disposed between the top flange 50 and the cross beam 16. As is best shown in FIG. 5, the cushion 32 and the trim cover 34 may be received in or extend into the groove 72 such that the cushion 32 and trim cover 34 may be spaced apart from and may not engage the cross beam 16. On the first rear flange 48' and the second rear flange 48", the protrusions 70 may be disposed rearward of the groove 72. As such, the groove 72 may be disposed between the top flange 50 and the protrusions 70.

The top flange 50 may be disposed underneath the seat back 12. The top flange 50 may extend upwardly away from the rear flange 48 and the groove 72 in a direction that extends away from the bottom side 42 and toward the seat back 12. In addition, the top flange 50 may extend laterally across and associated rear flange (e.g., between opposite lateral sides of a rear flange). As is best shown in FIG. 4, a top flange 50 may extend partially across the first rear flange 48' and the second rear flange 48" and may extend completely across the third rear flange 48'''. As is best shown in FIG. 5, the top flange 50 may extend above the cross beam 16 and may have a generally curved cross section. The cushion 32 and the trim cover 34 may extend over the top flange 50 to the groove 72. As such, at least a portion of the cushion 32 and the trim cover 34 may be disposed between the cross beam 16 and the top flange 50.

Referring to FIG. 2, one or more mounting hooks 52 may be provided with the support block 30. In FIG. 2, two mounting hooks 52 are shown that extend away from the top side 40 of the support block 30. For example, the mounting hooks 52 may be extend into a corresponding pocket 60 and may be located underneath the primary seating positions 20. The mounting hooks 52 may have any suitable configuration. For example, the mounting hooks 52 may be U-shaped and may be configured to be secured to a corresponding mounting feature that may be provided on the vehicle body structure 24, such as a bracket. As such, the mounting hooks 52 may couple the seat bottom 14 to the vehicle body structure 24.

Referring to FIGS. 2-4, the cushion 32 may be configured to help support a seat occupant. The cushion 32 may be disposed on one or more surfaces or sides of the support block 30, such as the top side 40, front side 44, and lateral sides 46. In at least one embodiment, the cushion 32 may not extend over at least a portion of the first rear flange 48', the second rear flange 48", and third rear flange 48'''. For instance, the cushion 32 may not extend over or engage the protrusions 70. The cushion 32 may be made of a different, softer material than the support block 30 to improve occupant comfort. For example, the cushion 32 may be made of a molded polymeric material such as open cell foam or closed cell foam.

Referring to FIG. 4, the trim cover 34 may form an exterior surface of at least a portion of the seat bottom 14. The trim cover 34 may be disposed on cushion 32. For example, the trim cover 34 may engage and may at least partially cover or conceal the cushion 32. The trim cover 34 may extend across a top side of the cushion 32 that may be configured to face toward and support a seat occupant. In addition, the trim cover 34 may extend across a front side and opposing lateral sides of the cushion 32. The trim cover 34 may not cover the entirety of the first, second, and third rear flanges 48', 48", 48'''. For example, the trim cover 34 may not extend over or engage the protrusions 70 and may not be disposed between the cross beam 16 and the first, second, and third rear flanges 48', 48", 48''' as is best shown in FIG. 5. The trim cover 34 may be made of any suitable material, such as fabric, vinyl, leather, or combinations thereof. The trim cover 34 may be mounted on the seat bottom 14 in any suitable manner. For example, the trim cover 34 may be secured with one or more attachment features, such as a hook, clip, ring, hook and loop fastener, drawstring or the like.

Referring to FIGS. 1-3, the cross beam 16 may help reinforce the vehicle body structure 24. For example, the cross beam 16 may be disposed in a horizontal position in the passenger compartment of a vehicle and may extend between the left and right sides of the vehicle body structure 24. The cross beam 16 may be mounted to the vehicle body structure 24 such that the cross beam 16 is stationary and is fixedly disposed on the vehicle body structure 24. As is best shown in FIG. 3, the cross beam 16 may include a first cross beam mounting bracket 90 and a second cross beam mounting bracket 92 that may be provided for mounting the cross beam 16 to the vehicle body structure 24. The first and second cross beam mounting brackets 90, 92 may be spaced apart from each other and may be fixedly disposed on the cross beam 16 between opposing ends of the cross beam 16. The first and second cross beam mounting brackets 90, 92 may be received in the gaps of the support block 30. More specifically, the first cross beam mounting bracket 90 may be received in the first gap 80 and the second cross beam mounting bracket 92 may be received in the second gap 82. In addition, the first and second cross beam mounting brackets 90, 92 may be spaced apart from and may not engage the support block 30 in one or more embodiments.

The cross beam 16 may also inhibit movement of the seat bottom 14 in response to a vehicle impact event. For example, the cross beam 16 may engage one or more of the rear flanges of the support block 30, such as the protrusions 70 of the first and second rear flanges 48', 48", and may limit or inhibit the seat bottom 14 from rotating about the mounting hooks 52. As such, the cross beam 16 may help hold the seat bottom 14 under the seat back 12 and inhibit the seat bottom 14 from rotating about the mounting hooks 52 toward the front of the vehicle in response to a front vehicle impact event.

The cross beam 16 may be a separate component from the seat back 12 and the seat bottom 14. The cross beam 16 may extend laterally across the seat bottom 14. For instance, the cross beam 16 may be disposed on the top side of the support block 30 and may extend across the rear flanges 48', 48", 48'". The cross beam 16 may not extend through the support block 30. As such, the cross beam 16 may not be received within and may not extend through the seat bottom 14.

As is best shown in FIG. 5, the cross beam 16 may be completely disposed in a rearward direction from the cushion 32 and the trim cover 34 and may not engage the cushion 32 or the trim cover 34. Moreover, the cross beam 16 may be disposed between the seat back 12 and the seat bottom 14 such that the cross beam 16 may be spaced apart from and may not engage the seat back 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat system comprising:
   a seat bottom that includes a support block, a cushion disposed on the support block, and a trim cover disposed on the cushion; and
   a cross beam that extends laterally across the seat bottom and is disposed on a top side of the support block such that the cross beam does not extend through the seat bottom, wherein the support block includes a front side, a rear flange that extends away from the front side and the cushion, a bottom side, and a top flange that extends from the rear flange in a direction that extends away from the bottom side, the cushion extends over the top flange to the rear flange, the cross beam is disposed on the rear flange, and the trim cover extends over the top flange to the rear flange such that the trim cover is disposed between the cross beam and the top flange.

2. The seat system of claim 1 wherein the cross beam inhibits movement of the seat bottom in response to a vehicle impact event.

3. The seat system of claim 1 wherein the cross beam does not engage the cushion and the trim cover.

4. The seat system of claim 1 wherein the cross beam is completely disposed in a rearward direction from the cushion and the trim cover.

5. The seat system of claim 1 wherein the cross beam is mounted to a vehicle body structure.

6. The seat system of claim 5 wherein the cross beam is stationary and is spaced apart from the seat back, the cushion, and the trim cover.

7. The seat system of claim 6 wherein the cross beam is disposed between the seat bottom and the seat back and is not part of the seat back.

8. The seat system of claim 1 wherein the cross beam is spaced apart from the trim cover.

9. The seat system of claim 1 wherein the cross beam is spaced apart from the cushion.

10. A seat system comprising:
    a seat bottom that includes a support block, a cushion disposed on the support block, and a trim cover disposed on the cushion; and
    a cross beam that extends laterally across the seat bottom and is disposed on a top side of the support block such that the cross beam does not extend through the seat bottom, wherein the support block includes a front side, a rear flange that extends away from the front side and the cushion, a bottom side, and a top flange that extends from the rear flange in a direction that extends away from the bottom side, the cushion extends over the top flange to the rear flange, the cross beam is disposed on the rear flange, and the rear flange has a groove that is disposed adjacent to the top flange, wherein the cushion and the trim cover extend into the groove.

11. The seat system of claim 10 wherein the trim cover is spaced apart from the cross beam.

12. The seat system of claim 10 wherein the rear flange has first and second protrusions that extend away from the bottom side and engage the cross beam, wherein the groove is disposed between the first and second protrusions and the top flange.

13. The seat system of claim 10 wherein the cushion is spaced apart from the cross beam.

14. A seat system comprising:
    a seat bottom that includes:
      a support block having a front side, a first rear flange, and a second rear flange, wherein the first rear flange and the second rear flange are spaced apart from each other, protrude rearwardly on a rear end of the support block, and each have a first protrusion that protrudes upwardly toward a seat back,
      a cushion that is disposed on the support block and extends across the front side, and a trim cover that is disposed on the cushion; and a cross beam that extends lengthwise laterally across the seat bottom such that the cross beam does not extend through the seat bottom, wherein the cross beam is disposed on the first protrusion of the first rear flange and the first protrusion of the second rear flange and does not engage the cushion and does not engage the trim cover.

15. The seat system of claim 14 wherein the support block includes a third rear flange, wherein a first gap separates the first rear flange from the second rear flange and a second gap separates the second rear flange from the third rear flange, and the cross beam does not engage the third rear flange.

16. The seat system of claim 15 wherein the cross beam includes a first and second cross beam mounting brackets for mounting the cross beam to a vehicle body structure, wherein the first and second cross beam mounting brackets are received in the first and second gaps, respectively, and are spaced apart from the cushion.

17. The seat system of claim 15 wherein a seat back is disposed above the cross beam, the first rear flange, the second rear flange, and the third rear flange such that the seat back is spaced apart from and does not engage the first rear flange, the second rear flange, and the third rear flange.

18. The seat system of claim 15 wherein the first rear flange includes a second protrusion that is spaced apart from the first protrusion, wherein the cross beam engages the first protrusion and the second protrusion.

19. The seat system of claim 18 wherein the second rear flange includes a second protrusion that is spaced apart from the first protrusion of the second rear flange, wherein the cross beam engages the first protrusion and the second protrusion of the second rear flange.

20. The seat system of claim 14 wherein the support block has a mounting hook for securing the seat bottom to a vehicle body structure, wherein the cross beam inhibits the seat bottom from rotating about the mounting hook.

* * * * *